May 28, 1940.  O. M. JENSEN ET AL  2,202,256
HYDRAULIC FEED FOR POWER DRIVEN HACK SAWS
Filed Dec. 24, 1936  3 Sheets-Sheet 1

INVENTOR.
Otto M. Jensen, Thomas W.
BY Whitley and Frank J. Wrnk
John W. Michael
ATTORNEYS May 28, 1940.  O. M. JENSEN ET AL  2,202,256
HYDRAULIC FEED FOR POWER DRIVEN HACK SAWS
Filed Dec. 24, 1936  3 Sheets-Sheet 2

INVENTOR.
Otto M. Jensen,
Thomas W. Whitley
and Frank J. Nrukl
BY John W. Michael
ATTORNEY.

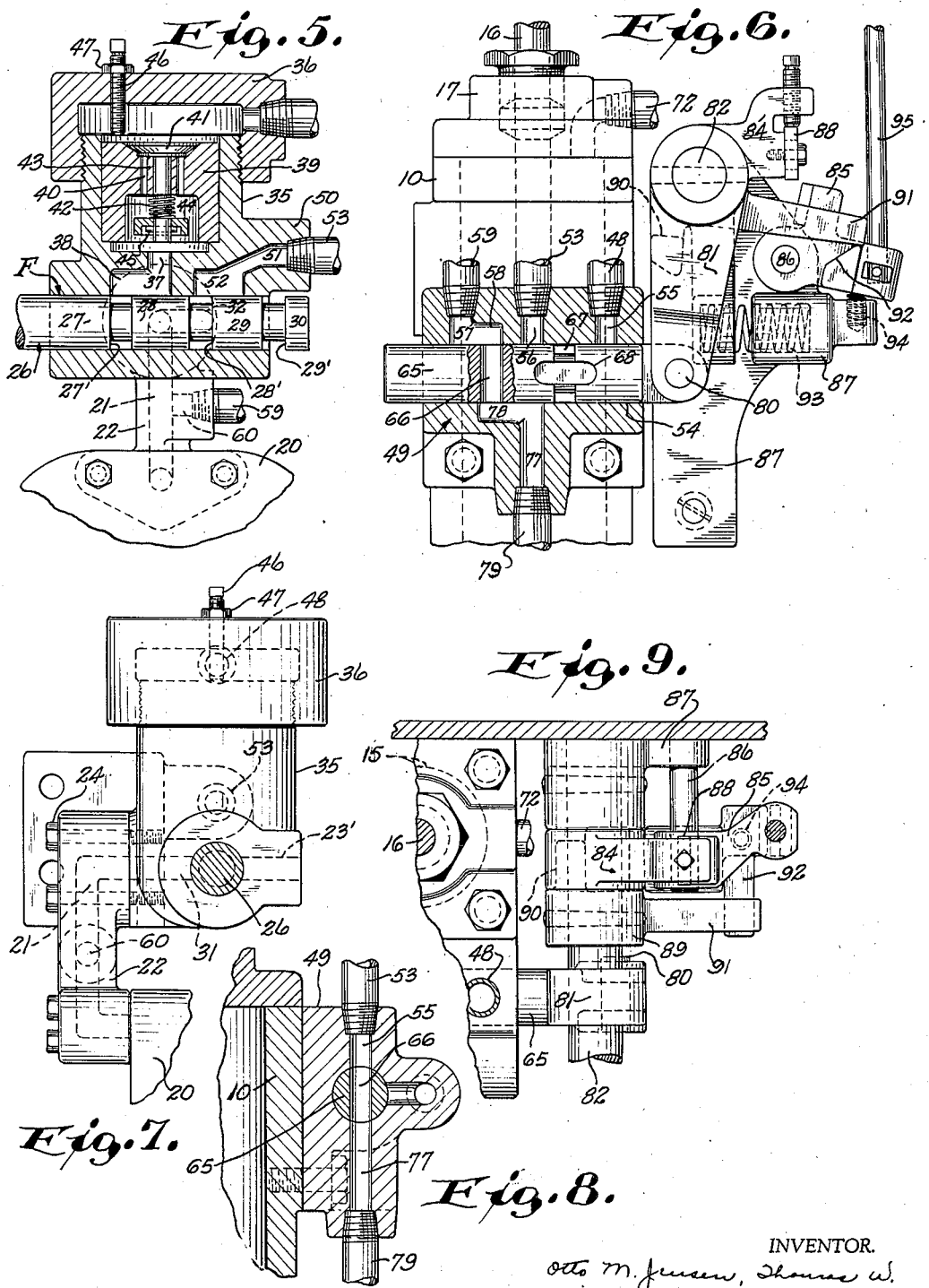

Patented May 28, 1940

2,202,256

UNITED STATES PATENT OFFICE 2,202,256

HYDRAULIC FEED FOR POWER DRIVEN HACK SAWS

Otto M. Jensen and Frank T. Wruk, Racine, and Thomas W. Whitley, Kenosha, Wis., assignors to Peerless Machine Company, Racine, Wis., a corporation of Wisconsin Application December 24, 1936, Serial No. 117,526

16 Claims. (Cl. 29—73)

This invention relates generally to a metal sawing machine having combined therewith a hydraulic feed for forcing the teeth of the saw blade into the work on each sawing stroke, automatically shifting the saw to carry its teeth out of operative engagement with the work on each return stroke of the saw blade and also effective to return the saw to its starting position at any time under the control of the operator and automatically after the completion of the cut.

Machines of the character here contemplated usually have a frame carrying the saw blade which is reciprocated back and forth from the crank of a power driven crank shaft. The frame is mounted for reciprocation in a carriage which is mounted for sliding movement along lines perpendicular to the path in which the saw blade is reciprocated.

In carrying out the present invention a fluid pressure motor made up of the usual elements, that is, a piston and a cylinder, is provided, one of the motor elements being anchored and the other being connected to the carriage on which the saw frame is mounted and with respect to which it is reciprocated. A suitable source of fluid under pressure, preferably a gear type of oil pump, is provided. During a sawing operation fluid under pressure is supplied to the motor alternately on opposite sides of its piston under the influence of a feed control valve operated automatically from and in synchronism with the crank shaft which reciprocates the saw and designed to cause the motor to feed the saw into the work on each sawing stroke and yet shift the saw out of operative engagement with the work on each return stroke. In the fluid pressure line leading to that side of the motor, which, when supplied with fluid pressure, is effective to feed the saw into the work, there is incorporated a valved piston structure of such character as to insure the supply of sufficient fluid pressure for feeding the saw into the work and yet limit the extent to which the saw is moved away from the work on each return stroke. Also combined with the fluid pressure motor and its source of supply of fluid under pressure is a full return control valve operated automatically when the cut has been completed to block off the valved piston and the feed control valve from communication with the motor and provide for a quick and smooth return of the saw and its associated elements to their starting position independently of said valved piston and said feed control valve. While this return control valve is operated automatically upon the completion of the cut it may also be operated manually at any time.

Another object of the invention is to provide a metal sawing machine of the character indicated and which is simple and durable in construction, reliable, efficient and automatic in its operation and easy and comparatively inexpensive to manufacture and maintain.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 5 is a view similar to Figure 3 but illustrating the feed control valve in the position to which it is shifted for each return stroke of the saw;

Figure 6 is a view similar to Figure 4 but showing the mechanism controlling the position of the return valve tripped and the return valve is in the position which it assumes at the completion of a cut whereby to effect return of the saw, its frame and carriage to their starting position;

Figure 7 is a view in vertical section taken on line 7—7 of Figure 2;

Figure 8 is a fragmentary view in transverse vertical section taken on line 8—8 of Figure 2;

Figure 9 is a fragmentary view in top plan showing the tripping mechanism associated with the return control valve;

Figure 10 is a view in horizontal cross section taken on line 10—10 of Figure 2; and Figure 11 is a similar view taken on line 11—11 of Figure 2.

Figure 1:
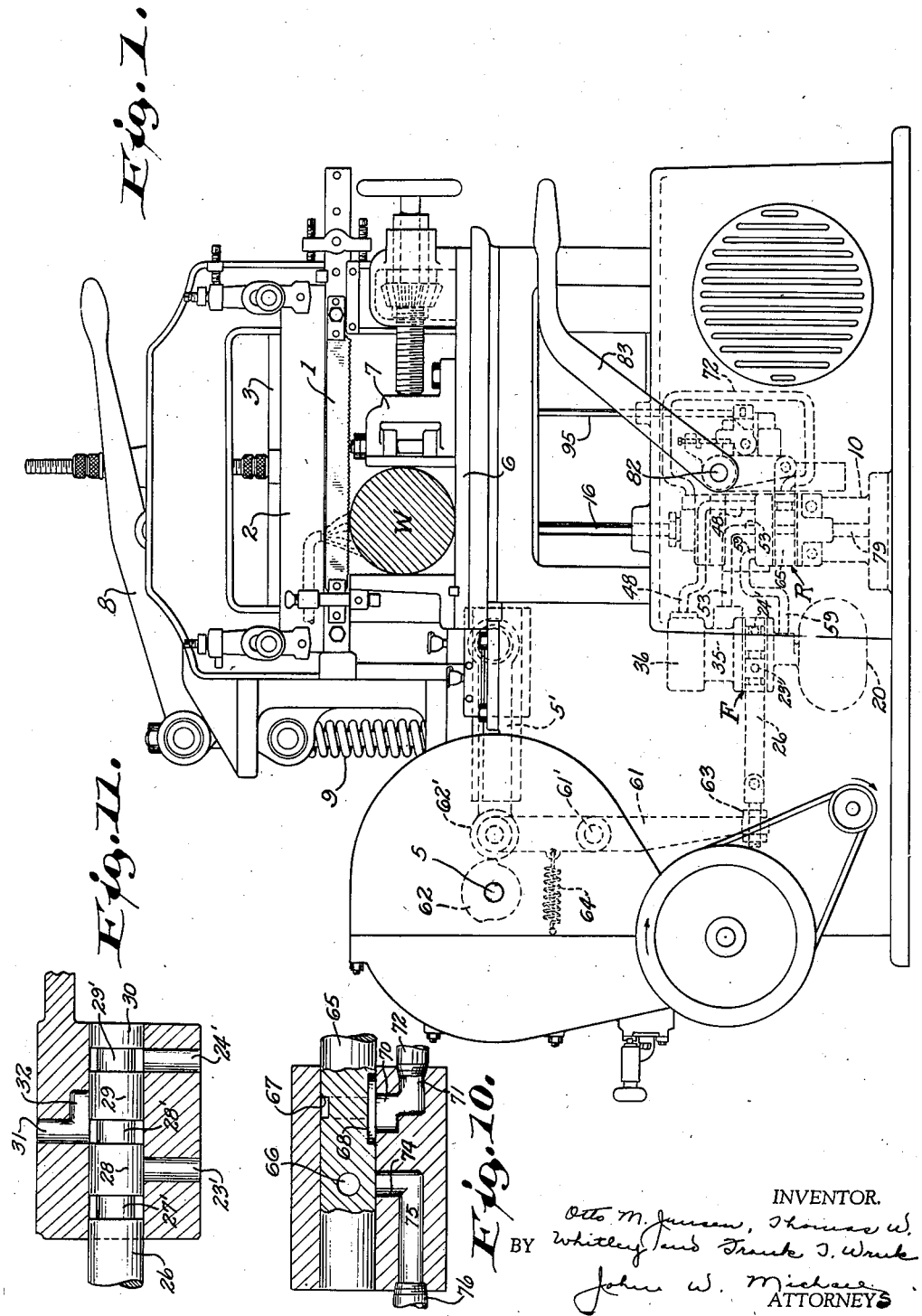
Figure 1 is a view in elevation showing a metal sawing machine equipped with a hydraulic feed embodying the present invention.

Referring to the drawings, and more particularly to Figure 1, there is shown a metal sawing machine which, except for the hydraulic feed embodying this invention, is constructed in accordance with the teaching of Patent No. 1,598,011, granted August 31, 1926, to Charles Rasmussen and assigned to the Peerless Machine Company, of Racine, Wisconsin, the assignee of the present invention. Reference is made to said Patent No. 1,598,011 for a complete disclosure of the general structure of the metal sawing machine with which the hydraulic feed embodying the present invention is combined.

As illustrated generally in Figure 1, the sawing machine, just as in the patent referred to, includes a saw blade 1 fastened to and reciprocated with a four-side saw frame 2. The frame 2 is supported for reciprocation in a vertically adjustable carriage 3 which is mounted for vertical movement in guide-ways provided therefor on the stationary frame of the machine. The frame 2 and saw blade 1 are reciprocated by means of a crank and connecting rod 5' which are actuated by the power driven crank shaft 5. The work designated at W is clamped on the work bed or cutting bed 6 by means of a suitable work holder 7. To lift or help lift the carriage together with its saw frame to its starting position after making a cut a lever 8 is provided and is spring counter-balanced as at 9 just as in the patent mentioned.

The hydraulic feed embodying the present invention comprises a cylinder 10 which is securely fastened to the bottom 12 of a tank 13 which is fastened in position on the base of the machine. A piston 15 is fitted in the cylinder 10 and has a piston rod 16 secured thereto and projecting upwardly through a stuffing box 17 to the lower cross member of the carriage 3 to which it is suitably secured. An oil pump 20 is supported in the tank 13 near the bottom thereof and has its delivery end communicating with a passage 21 in a short connecting member 22 to which the casing 23 of a feed control valve designated generally at F is bolted, as indicated at 24 in Figure 7. The casing 23 has a horizontally disposed cylindrical valve chamber 25 extending therethrough. A piston valve 26 is slidably fitted in said valve chamber 25 and has its pistons 27, 28, 29 and 30 spaced by means of annular grooves 27', 28' and 29'. The passage 21 leading from the delivery end of the pump through the connecting member 22 is in open communication with a transverse passage 31 provided at the center of and in the rear wall of the casing. At the point where this passage 31 communicates with the valve chamber 25 it is elongated by means of a slot 32 provided in the valve casing and opening into the valve chamber.

The front wall of the valve casing 23 is provided with discharge openings 23' and 24' which lead from the valve chamber 25 and communicate freely with the interior of the tank 13.

A cylinder 35 is disposed immediately above and may be cast integral with the valve casing and provided with a removable head 36. A central passage 37 extends vertically between the valve chamber 25 and the lower end of the cylinder 35 and at the point where this passage 37 communicates with the valve chamber 25 it is enlarged by means of a slot 38. A piston 39 is fitted in the cylinder 35 and is provided with an axial opening 40 therethrough controlled by a check valve 41 which is biased to closed position by means of a spring 42 interposed between the spider guide 43 of the check valve and a cup 44 held on the piston by a pin 45. A stop screw 46 locked in any adjustment by means of a lock nut 47 limits the upward movement of the piston.

The upper end of the cylinder communicates with one end of a pipe 48, the opposite end of which is connected to the casing 49 of the return valve designated generally at R.

In between the casing 23 of the feed control valve F and the cylinder 35 the structure is provided with an integral lateral enlargement 50 provided with a passage 51 which is enlarged at the point where it communicates with the valve chamber 25 as indicated at 52. The passage 51 communicates with one end of a pipe 53 which is also connected with the casing 49 of the return valve R.

The casing 49 of the return valve R has a valve chamber 54 extending therethrough. The pipe 48 has one of its ends communicating with a port 55 opening into the valve chamber 54 through the top of the same. Likewise the pipe 53 has one of its ends communicating with a port 56 extending through the top of the casing to the valve chamber 54. In addition, the top of the valve casing 49 of the return valve is provided with a port 57 enlarged as at 58 at the point where it communicates with the valve chamber 54. One end of a pipe 59 communicates with the port 57 whereas its opposite end communicates with a port 60 extending transversely of the coupling member 22 and communicating with its passage 21 in between the pump and the feed valve F.

A valve 65 in the form of a sliding plunger is fitted in the valve chamber 54 and is provided with a transverse passage 66 and with an annular groove 67 spaced from the passage 66. A slot 68 in the forward side portion of the face of the valve intersects the annular groove 67 and extends beyond both side walls of the same.

The forward wall of the valve casing 49 is provided with a port 70 opening into the valve chamber and communicating with a passage 71 which is connected to one end of a pipe 72. The opposite end of the pipe 72 communicates with the interior of the upper end of the motor cylinder as indicated at 73. This front wall of the valve casing also has a port 74 opening into the valve chamber at its center and connecting with a passage 75 which leads out through the end of the valve casing and communicates with a discharge fitting 76 which discharges oil back into the tank 13.

The lower portion of the return valve casing 49 is provided with a passage 77 enlarged as at 78 at the point where is communicates with the valve chamber 54. A pipe 79 has one end communicating with the passage 77 and has its other end communicating with the interior of the cylinder at its lower end.

The valve 26 is reciprocated back and forth by means of an operating lever 61 fulcrumed on the machine frame as indicated at 61' and having a roller 62' at one end which bears against a cam 62 fixed to and rotated with the crank arm 5. The end of the lever opposite its roller is suitably connected as at 63 with the valve 26. A spring 64 maintains the roller of the lever in engagement with the cam 62.

For the purpose of controlling the position of the valve 65 one end of the valve is pivotally connected as at 80 with a valve operating lever 81 pinned to a horizontal shaft 82 extending transversely of the machine and equipped at one side of the machine with a hand lever 83 whereby the shaft 82 may be manually adjusted if desired. A latching lever 84 is loosely mounted on the shaft 82. A latch 85 pivotally mounted as at 86 on a bracket 87 is engageable with an adjustable latch block 88 on the latch lever 84 to secure the latch lever in the position shown in Figures 2 and 4. A trip lever 89 pinned to the shaft 82 is provided with a lateral projection 90 which bears against the depending arm of the latch lever 84. This trip lever also has an outwardly extending projection 91 which is engageable with a lateral projection 92 provided on the latch 85. A compression coil spring 93 is provided between the mounting plate and the latch lever and has its ends received in sockets provided on these parts. This spring tends to swing the latch lever in a counter-clockwise direction as viewed in the drawings but such movement is prevented as long as the latch 85 is engaged with the latch block 88. A spring 94 tends to maintain the latch 85 engaged with the latch block 88.

A stop rod 95 is pivoted at its lower end to an arm of the latch 85 and extends upwardly therefrom through a guide bearing on the frame into the path of a lug or projection 96 provided on the carriage.

With this arrangement, when the saw completes the cut the projection 96 presses down on the stop rod 95 to swing the latch 85 out of engagement with the latch block 88 of the lever 84. The spring 93 now acts to swing the latch lever 84 in a clockwise direction as viewed in Figure 4 and this motion is transmitted to the shaft 82 by virtue of the engagement of the depending arm of the latch lever 84 with the lateral projection 90 of the trip lever 89. The consequent turning of the shaft 82 (lever 89 being fixed thereto) swings the valve operating lever to the left as viewed in Figure 4 and consequently to the position shown in Figure 6.

Figures 3, 4:
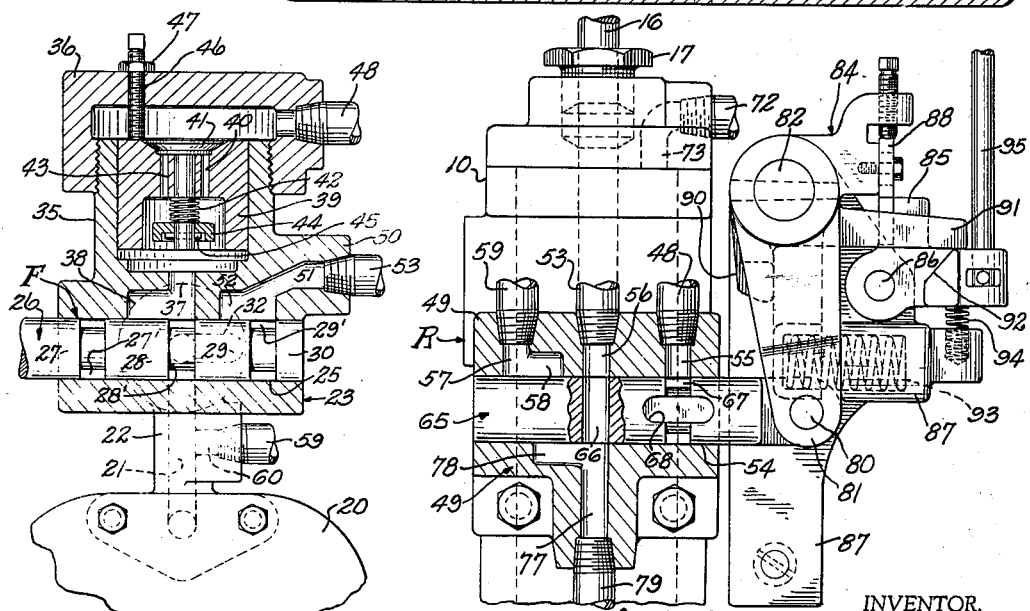
Figure 3 is a fragmentary view partly in side elevation and partly in longitudinal vertical section showing the feed control valve and also the valve piston incorporated in the conduit between the feed control valve and one side of the motor, the feed control valve being illustrated in the position it takes for the sawing stroke.
Figure 4 is a view similar to Figure 3 but showing the return control valve and associated mechanism, the return control valve being shown in the position which it assumes throughout the cutting operation.

The valve 65 may be returned to its original position by grasping the hand lever 83 and manually turning the shaft 82 in a counter-clockwise direction as viewed in Figure 6 whereupon the trip lever 89 will act through its projection 90 to cause the latch lever 84 to move from the position shown in Figure 6 back to the position shown in Figure 4, the spring 93 being compressed during this motion and the spring 94 acting upon resetting of the parts to again engage the latch 85 with the latch block 88.

Figure 2:
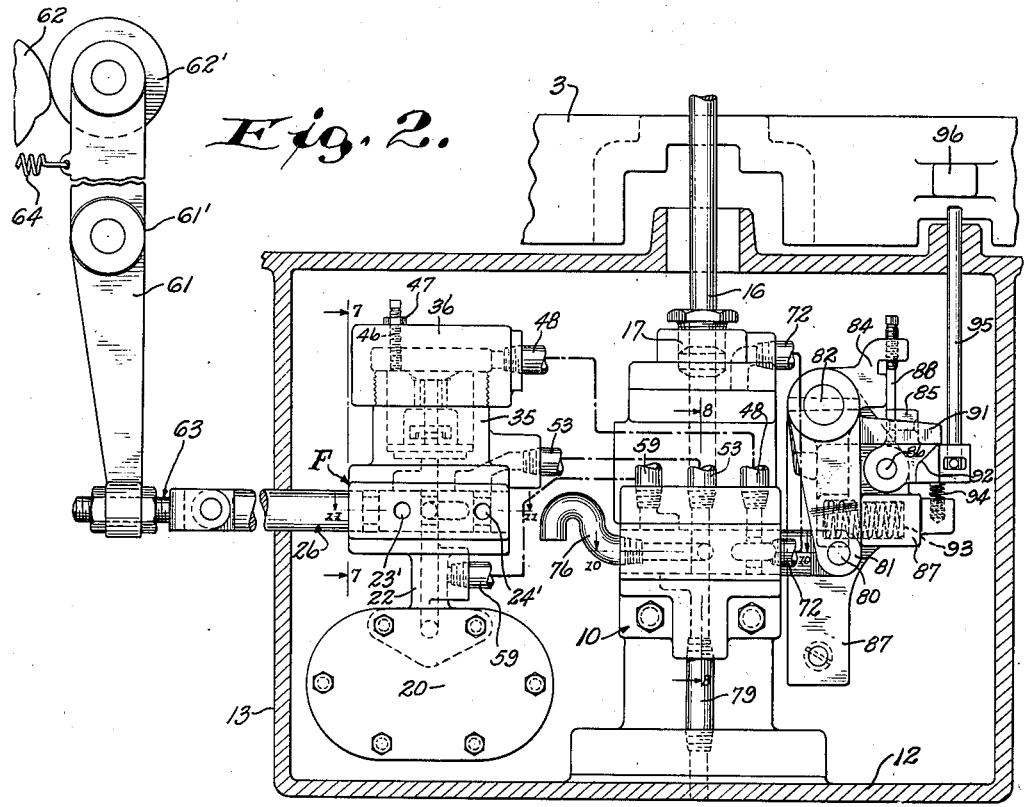
Figure 2 is a fragmentary view on an enlarged scale, partly in elevation and partly in vertical section illustrating the hydraulic feed more in detail.

The valve 65 may be manually tripped at any time by appropriately moving the hand lever 83 to cause the shaft 82 to rotate in a clockwise direction, as viewed in Figure 2 or Figure 4 and hence the projection 91 to coact with the cam 92 of the latch 85 and disengage it from the latch block 88.

When the machine is in operation the lever 61 is continuously rocked back and forth by the cam 62 on the crank shaft 5 so that for each sawing stroke of the saw blade 1 the feed control valve F occupies the position shown in Figure 3 whereas on each return stroke of the saw this valve occupies the position shown in Figure 5. All during the time that the cut is being made the return control valve remains in the position shown in Figure 4.

On each sawing stroke of the saw blade 1 with the feed control valve positioned as shown in Figure 3 and the return control valve positioned as shown in Figure 4, fluid under pressure flows from the pump 20 through the passages 21 and 31, through the annular groove 28' of the piston valve member 26, thence through the passage 37 into the lower end of the cylinder 35. In the cylinder 35 the fluid under pressure raises the piston 39 until its upward movement is arrested by virtue of its engagement with the stop screw 46. When this occurs the fluid pressure opens the check valve 41 and flows past this check valve to the pipe 48 (see Figures 2, 3 and 4). From the pipe 48 the fluid pressure flows through the passage 55 in the casing of the return valve R, thence around the annular groove 67 of the valve member 65 of this valve R to the port 70 in the front wall of the valve casing (see Figure 10) and thence through passages 70 and 71 and pipe 72 to the top of the cylinder 10. Pressure is thereby exerted on the top of the piston 15 to force it downwardly and inasmuch as pressure is relieved below the piston, the carriage, saw frame and saw blade are forced downwardly toward the work while the saw blade is making a cut. The pressure is relieved below the piston by virtue of its flow, through the pipe 79 to the passage 77, through the transverse passage 66 in the valve member 65 of the return valve R, thence through passage 56 and pipe 53 to passage 51 in the projection 50 of the feed valve F, thence to the annular groove 29' and out through the discharge port 24' of the casing 23 of the feed control valve (see Figure 11).

On each return stroke of the saw blade the feed control valve is shifted from the position shown in Figure 3 to the position shown in Figure 5. Consequently fluid pressure now flows from the passage 21 through the passage 31 and its slot-like elongation 32 to the annular groove 28' of the piston valve member 26, thence through the passage 51 in its enlargement and pipe 53 to the passage 56 of the casing of the return valve R, thence through the passage 66 of the valve member 65 to the passage 77 and from passage 77 through pipe 79 to the underside of the piston. At this time the piston 26 of the valve member 26 blocks the flow of fluid under pressure to the cylinder 35, and since the lower end of the cylinder 35 is now in communication with the discharge port 23' through passages 37 and 38 and annular groove 27' the application of pressure to the underside of the main piston 11 will displace fluid under pressure from the upper side of the cylinder 10 back through the pipe 72, passage 71 and port 70, around the annular groove 67 of the valve 65, through the passage 55 and pipe 48, to the upper end of the cylinder 35, so that the piston 39 will be forced downwardly to the position shown in Figure 5. This provides for shifting of the saw blade a sufficient distance to be out of operative engagement with the work on each return stroke.

On the completion of the cut the projection 96 on the carriage presses down on the stop rod 95 to trip the latch 85 and consequently allow the spring 93 to shift the valve member 65 from the position shown in Figure 4 to the position shown in Figure 6. This has the effect of giving the return valve R complete control over the operation of the fluid pressure feed motor, the feed control valve F and the valved piston 39, 41 associated therewith being effectively bypassed. With the valve member 65 and return valve R positioned as shown in Figure 6, fluid under pressure flows from the passage 21 through port 60 and pipe 59 to the passage 57 and thence through the enlargement 58 of this passage, through passage 66 of valve member 65 to passage enlargement 78 and passage 77 to the pipe 79 and thence to the underside of the piston 11. Pressure above the piston is relieved at this time since it may flow through the pipe 72, passage 71, port 70, groove 68 in valve member 65, to port 74 (see Figure 10), and thence through the passage 75 to the discharge fitting 76, from whence it flows back into the tank. Inasmuch as the ports 55 and 56, which are the only ones that communicate with the pump 20 through the feed control valve F, are both blocked off by the valve member 65 at this time, the return operation is solely under the control of the return valve.

After the saw blade has been returned to its starting position the hand lever 83 is actuated to reset the latch 85 and consequently shift the valve member 65 back to the position shown in Figure 4 so that the machine is ready for another cut.

The construction hereinabove described illustrates one way in which the invention may be advantageously embodied and also lends itself to ready illustration. The invention, however, contemplates that in lieu of connecting the different passages and ports of the several elements together by means of tubings or pipes that corresponding conduits or passages may be had by drilling or coring the same in suitable castings appropriately fastened together.

While we have shown and described one construction in which the invention may be advantageously embodied, it is to be understood that this construction has been selected merely for the purpose of illustration or example, and that various changes in the size, shape and arrangement of the parts may be made without departing from the spirit of the invention or the scope of the subjoined claims.

The invention claimed is:

1. A hydraulic feed for a metal sawing machine of the character having a saw and means for reciprocating the saw and comprising a double acting fluid pressure motor connected to the saw, a feed control valve actuated by said means to regulate the supply of fluid under pressure to said motor to cause it to feed the saw to the work during each sawing stroke and to withdraw it from the work during each return stroke, and means including a check valve supported for limited sliding movement while seated and interposed between the feed control valve and the motor to limit the extent which the motor moves the saw away from the work on the return stroke.

2. A hydraulic feed for a metal sawing machine of the character having a saw and means for reciprocating the saw and comprising a double acting fluid pressure motor connected to the saw, a feed control valve actuated by said means to regulate the supply of fluid under pressure to said motor to cause it to feed the saw to the work during each sawing stroke and to withdraw it from the work during each return stroke, and means for limiting the extent which the motor moves the saw away from the work during each return stroke and comprising a cylinder interposed between the motor and the feed control valve, a piston slidable in said cylinder, a check valve in said piston and adjustable means for limiting the stroke of the piston.

3. A hydraulic feed for a metal sawing machine of the character having a saw and means for reciprocating the saw and comprising a double acting fluid pressure motor connected to the saw, a feed control valve actuated by said means to regulate the supply of fluid under pressure to said motor to cause it to feed the saw to the work during each sawing stroke and to withdraw it from the work during each return stroke, means including a valved piston of limited stroke interposed between the feed control valve and the motor and operable under the direct influence of said fluid to limit the extent which the motor moves the saw away from the work on the return stroke, and means operable independently of said feed control valve and said valved piston to supply fluid under pressure to the motor to cause it to return the saw to starting position.

4. A hydraulic feed for a metal sawing machine of the character described having a saw, and means for reciprocating said saw and comprising a fluid pressure motor connected to the saw, means to regulate the supply of fluid under pressure to said saw to cause it to feed the saw to the work on each sawing stroke and to withdraw it from the work on each return stroke and comprising a feed control piston valve acting in one position to supply fluid under pressure to one end of the motor and allow fluid under pressure to discharge from the other end thereof and in its other position to reverse the action of the fluid under pressure on the motor, a cam and lever arrangement actuated by said first-named means for shifting said valve back and forth in synchronism with the movements of the saw, and means operable under the influence of the change of direction of the flow of said fluid for limiting the extent to which the saw is shifted away from the work on each of its return strokes.

5. A hydraulic feed for a metal sawing machine of the character described having a saw and means for reciprocating said saw and comprising a fluid pressure motor connected to the saw, means to regulate the supply of fluid under pressure to said saw to cause it to feed the saw to the work on each sawing stroke and to withdraw it from the work on each return stroke and comprising a feed control piston valve acting in one position to supply fluid under pressure to one end of the motor and allow fluid under pressure to discharge from the other end thereof and in its other position to reverse the action of the fluid under pressure on the motor, a cam and lever arrangement actuated by said first-named means for shifting said valve back and forth in synchronism with the movements of the saw, means operable under the influence of the change of direction of the flow of said fluid for limiting the extent to which the saw is shifted away from the work on each of its return strokes, and means independent of said piston valve and said last-named means to supply fluid under pressure to the motor to cause it to return the saw to its starting position upon the completion of the cut.

6. A hydraulic feed for a metal sawing machine of the character having a saw and means for reciprocating said saw and comprising a fluid pressure motor connected to the saw, a source of supply of fluid under pressure, means interposed between the source of supply of fluid under pressure and the motor and including a feed control valve operated in synchronism with the saw and a valved piston of limited stroke for supplying fluid under pressure to the motor during each sawing stroke to cause the motor to feed the saw to the work and for reversing the action of the motor to cause it to withdraw the saw from the work a limited distance during each return stroke, and means to block off all communication between the motor and said feed control valve and said valved piston and to supply fluid under pressure to said motor to cause it to return the saw to starting position.

7. A hydraulic feed for a metal sawing machine of the character having a saw and means for reciprocating said saw and comprising a fluid pressure motor connected to the saw, a source of supply of fluid under pressure, means interposed between the source of supply of fluid under pressure and the motor for supplying fluid under pressure to the motor during each sawing stroke to cause the motor to feed the saw to the work and for reversing the action of the motor to cause it to withdraw the saw from the work a limited distance during each return stroke, a return control valve associated with said last-named means and with said motor and said source of supply of fluid under pressure, and latching mechanism effective when latched to hold said return valve in position to provide for functioning of said last-named means in the manner stated and also effective when tripped to shift said return control valve to a position wherein said last-named means is shut off from communication with the motor and fluid under pressure is supplied from said source to said motor through said return control valve to cause said motor to return said saw to starting position.

8. A metal sawing machine of the character described comprising a saw, means for reciprocating said saw, a fluid pressure motor connected to the saw, a pump for supplying fluid under pressure to said motor, and means for regulating the supply of fluid under pressure to said motor and comprising a feed control valve interposed between the pump and the motor and operated in synchronism with the saw to cause the motor to feed the saw toward the work on each sawing stroke and to shift the saw away from the work on each return stroke, and a valved piston of limited stroke interposed between the said valve and one side of the motor to limit the extent which the saw is shifted away from the work on each return stroke, and a return control valve acting when tripped to cause the motor to move the saw back to its starting position independently of the action of the feed control valve and of said valved piston.

9. A metal sawing machine of the character described comprising a saw, means for reciprocating said saw, a fluid pressure motor connected to the saw, a pump for supplying fluid under pressure to said motor, and means for regulating the supply of fluid under pressure to said motor and comprising a feed control valve interposed between the pump and the motor and operated in synchronism with the saw to cause the motor to feed the saw toward the work on each sawing stroke and to shift the saw away from the work on each return stroke, and a valved piston of limited stroke interposed between said valve and one side of the motor and operable under the influence of said fluid to limit the extent which the saw is shifted away from the work on each return stroke.

10. A metal sawing machine comprising a stationary frame, a carriage movably mounted thereon, a reciprocating saw frame guided on the carriage transversely to its movement on the stationary frame, a saw secured to the saw frame, means for reciprocating the saw frame on the carriage, a fluid pressure motor connected to said carriage for imparting feeding movement thereto, a pump for supplying fluid under pressure, connections between the pump and the motor, a feed control valve incorporated in said connections and synchronized in its operation with the saw frame to cause the fluid under pressure to successively actuate the motor first in one direction and then in the other, a cylinder in one of said connections, a piston fitted in said cylinder and of limited stroke and a check valve in said piston whereby the actuation of the motor in one direction is limited.

11. A metal sawing machine comprising a stationary frame, a carriage movably mounted thereon, a reciprocatory saw frame guided on the carriage transversely to the movement on the stationary frame, a saw secured to the saw frame, means for reciprocating the saw frame on the carriage, a fluid pressure motor connected to said carriage for imparting feeding movement thereto, a pump for supplying fluid under pressure, connections between the pump and the motor, a feed control valve incorporated in said connections and synchronized in its operation with the saw frame to cause the fluid under pressure to successively actuate the motor first in one direction and then in the other, and means floatingly associated with said connections and operable under the influence of said fluid for limiting the actuation of the motor in one direction.

12. A metal sawing machine comprising a stationary frame, a carriage movably mounted thereon, a reciprocatory saw frame guided on the carriage transversely to the movement on the stationary frame, a saw secured to the saw frame, means for reciprocating the saw frame on the carriage, a fluid pressure motor connected to said carriage for imparting feeding movement thereto, a pump for supplying fluid under pressure, connections between the pump and the motor, a feed control valve incorporated in said connections and synchronized in its operation with the saw frame to cause the fluid under pressure to successively actuate the motor first in one direction and then in the other, means associated with said connections for limiting the actuation of the motor in one direction, and a return control valve associated with said connections, an independent connection between the return control valve and the pump, said return control valve having its individual discharge port, said return control valve having ports and passages in series with the feed control valve and said last-named means in one position of said return control valve and in another of its positions blocking off communication of said feed control valve and said last-named means and establishing communication between said pump and said motor through itself and said independent connections to return the carriage, saw frame and saw to starting position.

13. A metal sawing machine of the character described comprising a saw frame, supported for reciprocatory movement and for feeding movement toward the work, a saw fastened to said frame, a fluid pressure motor having the usual motor elements, that is, a cylinder and a piston fitted in said cylinder, means for anchoring one of said elements, means for connecting the other of said elements to the saw frame, a source of supply of fluid under pressure, means synchronized in its action with said reciprocating saw frame to regulate the supply of fluid under pressure from the source to the motor to cause the motor to be successively and reversely actuated to feed the saw into the work on the sawing stroke and shift it away from the work on its return stroke, means to limit the extent to which the motor is actuated on each return stroke, and means operable automatically and at will to establish communication between said source and said motor to cause the motor to return the saw frame to starting position.

14. A hydraulic feed for metal sawing machines of the character having a saw and means for reciprocating the same and comprising a fluid pressure motor connected to the saw, means operated in synchronism with the saw to supply fluid under pressure to the motor to cause it to feed the saw to the work during each sawing stroke and withdraw it from the work on each return stroke of the saw, said means including a device for limiting the withdrawal movement of the saw on each return stroke to a predetermined distance, and means operable independently of said device for supplying fluid under pressure to the motor to cause it to return the saw to its starting position upon the completion of the cut.

15. A hydraulic feed for metal sawing machines of the character having a saw and means for reciprocating the same and comprising a fluid pressure motor connected to the saw, and means operated in synchronism with the saw to supply fluid under pressure to the motor to cause it to feed the saw to the work during each sawing stroke and withdraw it from the work on each return stroke of the saw, said means including a device operable under the influence of said fluid for limiting the withdrawal movement of the saw on each return stroke to a predetermined distance.

16. A hydraulic feed for a cutting tool comprising a source of fluid under pressure, a fluid pressure motor operatively connected with said tool, a valve controlled by the operation of said tool and operable to supply said fluid to said motor to cause said motor to reverse its direction of operation, and means interposed between said valve and said motor and operable under the influence of the change of direction of the flow of said fluid to limit the effective space movement of said motor in one direction within a predetermined scope.

OTTO M. JENSEN.
F. T. WRUK.
THOS. W. WHITLEY.